Oct. 17, 1933.  J. E. McWILLIAMS  1,931,078
HANDLE FOR UMBRELLAS
Filed June 11, 1932
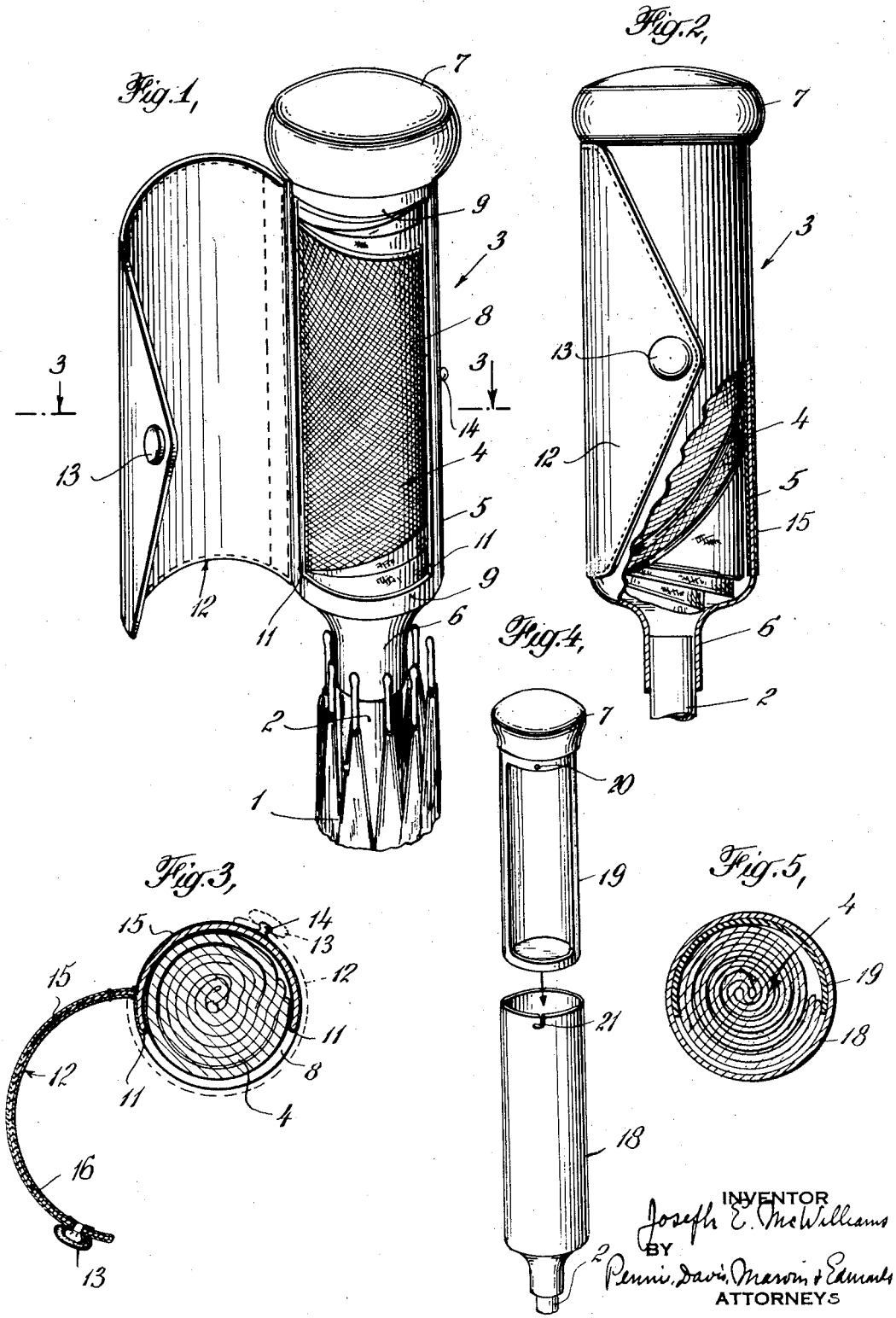

Patented Oct. 17, 1933

1,931,078

UNITED STATES PATENT OFFICE 1,931,078

HANDLE FOR UMBRELLAS

Joseph E. McWilliams, New York, N. Y.

Application June 11, 1932. Serial No. 616,580

2 Claims. (Cl. 135—47)

This invention relates to handles for umbrellas and the like and has for its object the provision of a receptacle or pocket in the handle constructed to receive and hold a pair of rubber overshoes.

In the accompanying drawing I have illustrated two preferred embodiments of my invention. In this drawing, Figure 1 is a perspective view of the handle showing the receptacle open and a pair of rubbers held within it; Figure 2 illustrates the handle with the receptacle closed, parts being broken away to illustrate the rubbers; Figure 3 is a transverse section taken along line 3—3 of Figure 1; Figure 4 illustrates a modified form of the invention, and Figure 5 is a transverse section on an enlarged scale through the handle of Figure 4 showing the rubbers in position.

Referring first to Figures 1, 2 and 3, 1 designates an umbrella of ordinary construction having a shank 2 and a handle 3. This handle, in accordance with my invention, is constructed in the form of a receptacle large enough to receive a pair of light weight rubber overshoes 4 compactly wound, but not too large to be conveniently grasped by the user of the umbrella. This receptacle comprises a metal cylinder 5 provided at its lower end with a reduced portion 6 designed to receive the upper end of the shank 2, and at its upper end with a knob 7 or other decorative element for completing the handle. The receptacle is provided with a longitudinal opening 8 somewhat shorter than the over-all length of the cylinder thereby forming end flanges 9, and extending circumferentially for substantially less than 180°, as most clearly shown in Figure 3. The receptacle thus formed is provided with over-hanging walls both along its sides, at 11, and at its ends, the flanges 9. This is an important feature and made necessary by the resiliency of the rubbers to be carried. Were it not for these overhanging walls it would be extremely difficult, if not impossible, to hold the rubbers in the receptacle long enough to close the cover. With the construction just described, the rubbers, after being rolled, can be placed within the receptacle and will remain in position without springing out.

In order, however, to prevent accidental removal of the rubbers and also in order to provide a handle which may be satisfactorily grasped and which will present a finished appearance, I provide the receptacle with a cover 12. This cover is hinged adjacent one edge of the opening, but back sufficiently so that there is a substantial overlap when the cover is closed, thus giving a clear opening when the cover is swung back and facilitating the insertion of the rubbers within the receptacle. The cover is of sufficient length to extend well over the opening in the receptacle when closed and is provided along its outer edge with a snap fastener 13 designed to cooperate with a companion member 14 on the cylinder. The cover is made of flexible material so that as it is closed pressure can be exerted through it against the rubbers, which may bulge slightly, and thus force them back into the receptacle. I have successfully used a sheet of celluloid as the base of the cover.

In order to provide the handle with a comfortable and satisfactory grip and also improve its looks and strengthen the cover, I provide a one-piece covering 15, preferably of leather, extending from the outer edge of the opening 8 to the outer edge of the cover. Thus, when the cover is closed the handle presents a neat and attractive appearance. I also provide a one-piece lining 16 for the receptacle and cover, preferably of some water-resistant material, such as rubberized fabric. This lining extends from the outer edge of the opening, around the inner edge, back to the cover hinge, and around to the outer edge of the cover, all as shown in Figure 3.

To insert a pair of rubbers within the handle receptacle they are first compactly wound and pushed through the opening. If the winding has been properly done, the rubbers will remain within the open receptacle and are held there by their own resiliency and the over-hanging walls of the cylinder. It is now a simple matter to close and snap the cover, even though the rubbers may bulge somewhat through the opening. Any tendency that the rubbers may have to extend over the edges of the opening and be pinched by the cover can be readily overcome by pressure exerted by the fingers through the flexible cover while closing it.

In Figures 4 and 5 I have illustrated a modified form of my invention. In this form the shank 2 of the umbrella terminates in a cylindrical sleeve 18 open at its outer end. The rubbers are placed within a cylindrical receptacle 19 of substantially the same form as the receptacle 5, described above, except that the reduced end 6 is lacking and there is no cover. The receptacle is, however, provided with the overhanging walls. In using this form of the invention the rubbers are wound, placed within the receptacle as before, and the receptacle then inserted into the sleeve through its open outer end. The receptacle is retained in the sleeve by means of a pin 20 cooperating with a bayonet slot 21. Or the receptacle may be made to fit with a spring fit, tight enough to hold it within the sleeve when empty. When filled, the slight bulging of the rubbers through the opening of the receptacle will exert a pressure against the inner wall of the sleeve and assist in holding the receptacle in place.

With an umbrella constructed in accordance with my invention it is possible to carry conveniently a pair of rubbers without, in any way, impairing the appearance or utility of the umbrella. The handle can perform its primary function as a handle whether the rubbers are stowed away within it or whether they are being worn.

I claim:

1. In an umbrella the combination of a shank, and a receptacle for rubbers mounted on the shank, comprising a stiff cylindrical frame having a longitudinal opening extending circumferentially for less than 180° thereby forming overhanging walls for retaining the rubbers within the receptacle, and a flexible cover for the opening hinged adjacent an edge thereof, the frame and cover constituting a handle for the umbrella.

2. An umbrella comprising a shank and a handle, the handle comprising a cylindrical metal frame having a longitudinal opening, extending circumferentially for less than 180° thereby providing overhanging sides, a flexible cover hinged along one side of the frame substantially back from one edge of the opening, a one-piece covering mounted on the frame and cover constituting a hand grip, and a one-piece lining mounted in the frame and cover.

JOSEPH E. McWILLIAMS.